July 14, 1953 — A. B. SEGAL — 2,645,246
MIXING AND DISPENSING VALVE
Filed May 26, 1947 — 2 Sheets-Sheet 1
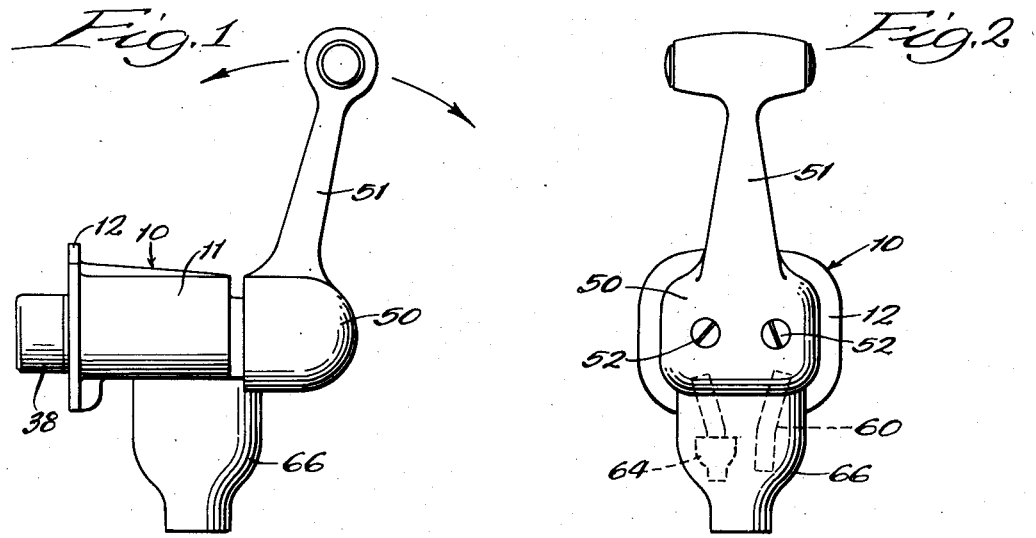
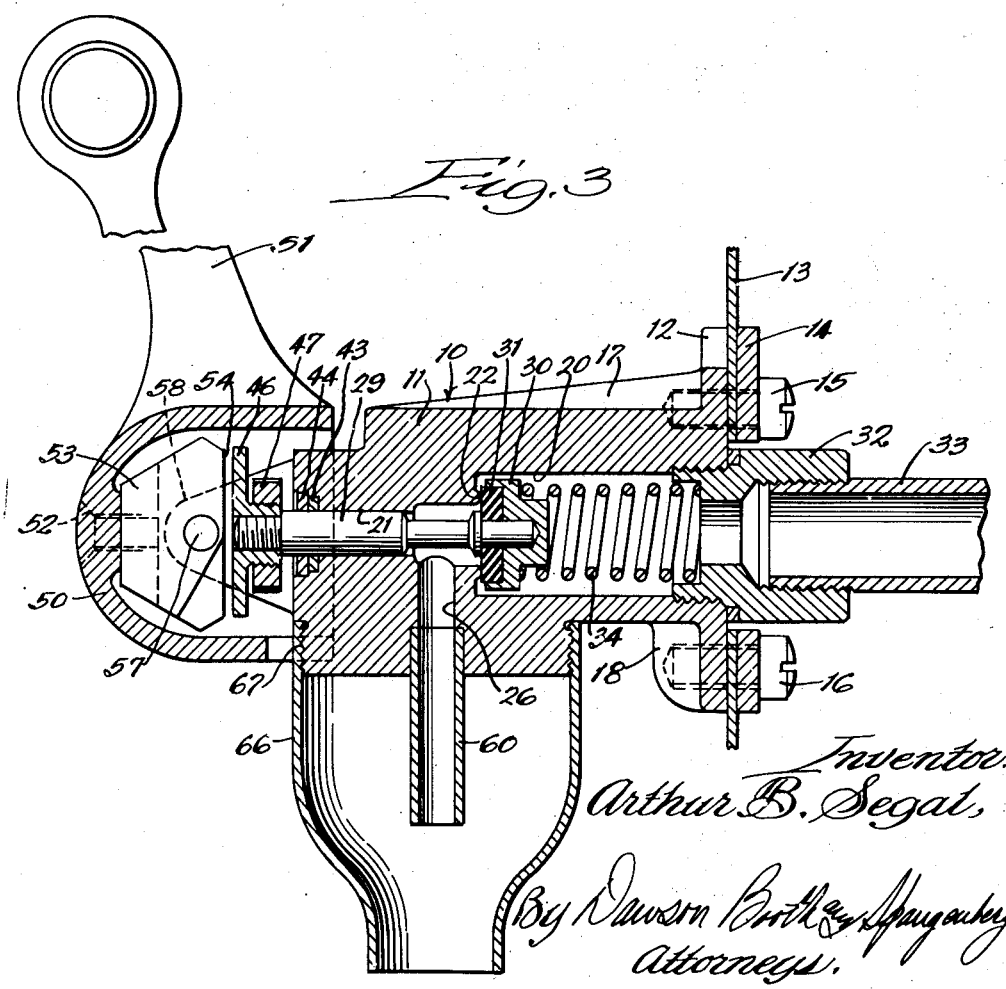

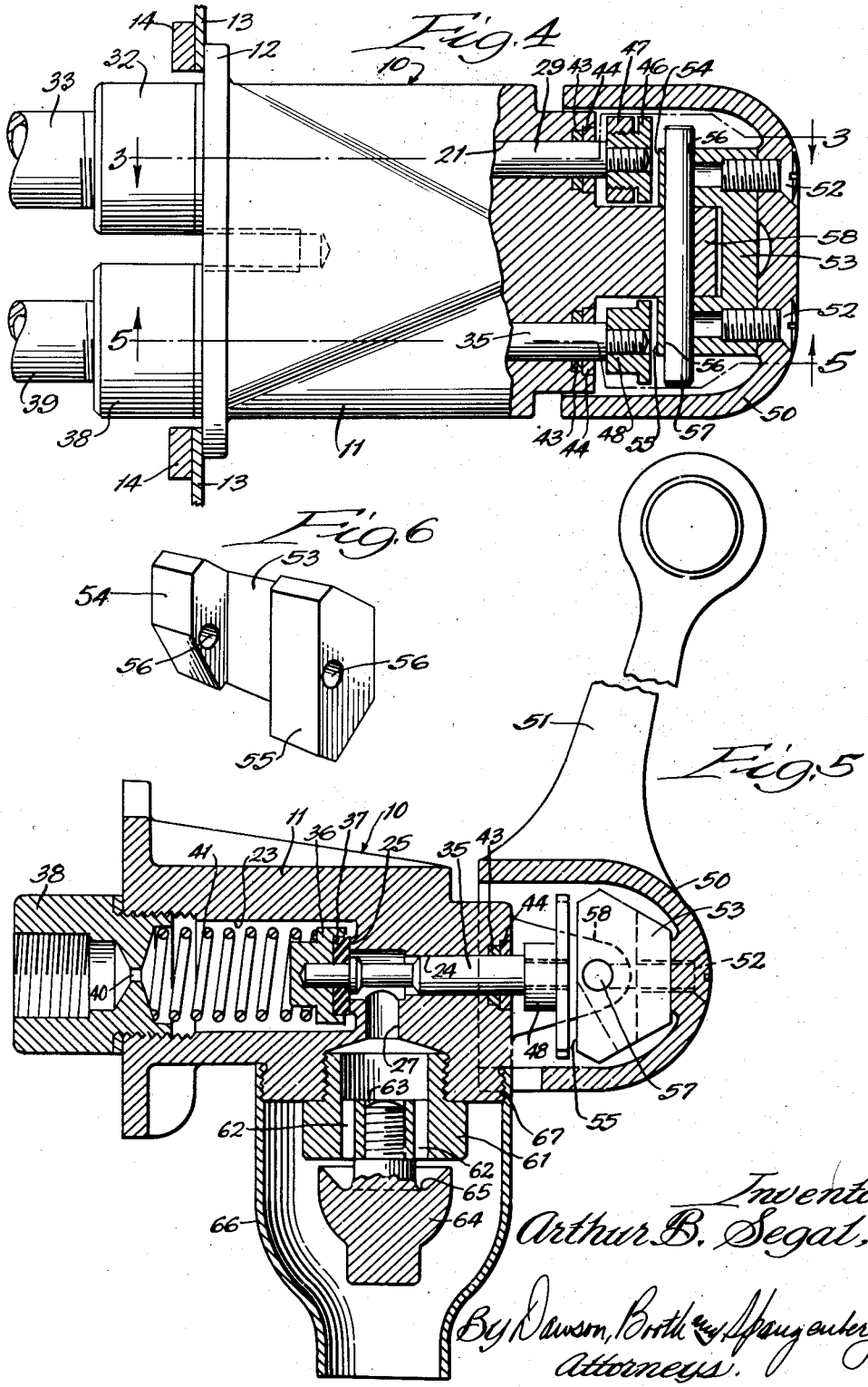

Patented July 14, 1953

2,645,246

UNITED STATES PATENT OFFICE 2,645,246

MIXING AND DISPENSING VALVE

Arthur B. Segal, Springfield, Ill., assignor, by mesne assignments, to General Bronze Corporation, a corporation of New York Application May 26, 1947, Serial No. 750,553

6 Claims. (Cl. 137—636)

1

This invention relates to mixing and dispensing valves generally and more particularly to such valves for mixing and dispensing syrup and soda water for making mixed drinks.

The principal object of this invention is to provide an improved mixing and dispensing valve which may be inexpensively manufactured and assembled, which may be readily mounted on a fountain or bar, which may be readily manipulated for dispensing mixed drinks, which may be adjusted for regulating the amount of syrup dispensed with respect to soda water, and which effervesces the soda water to enhance the appearance of the mixed drinks.

Further objects of this invention reside in the details of construction of the mixing and dispensing valve and the cooperative relationship between the component parts thereof.

Other objects and advantages will become apparent to those skilled in the art upon reference to the accompanying specification, claims, and drawings in which—

Figure 1 is a side elevational view of the mixing and dispensing valve;

Figure 2 is a front elevational view;

Figure 3 is a vertical sectional view taken substantially along the line 3—3 of Fig. 4;

Figure 4 is a plan view partly in section of the mixing and dispensing valve;

Figure 5 is a vertical sectional view taken substantially along the line 5—5 of Fig. 4; and Figure 6 is a perspective view of the cam assembly.

The mixing and dispensing valve is generally designated at 10 and includes a valve body 11 provided with a mounting flange 12 for mounting the valve body on a wall 13 of a fountain or bar. A ring 14 provided with holes for receiving screws 15 and 16 screwed into tapped holes in the valve body 11 is utilized for clamping the valve body to the wall 13. The tapped holes in the valve body for accommodating the screws 15 and 16 are accommodated by ribs 17 and 18 formed on the valve body.

The valve body is provided with a first longitudinal bore having a large diameter 20, a small diameter 21, and a valve seat 22 therebetween. The valve body is also provided with a second bore parallel to the first bore and having a large diameter 23, a small diameter 24, and a valve seat 25 therebetween. Discharge passages 26 and 27 communicate with the first and second parallel bores respectively adjacent the valve seats 22 and 25.

A first valve element 29 is slidably mounted in the first bore and it carries a cap 30 for holding a seating washer 31 in place thereon. The seating washer 31 cooperates with the seat 22 for regulating the passage of fluid thereby. A pipe connector 32 is carried at the end of the first bore for connecting a fluid supply pipe 33 in communication with the first bore. A spring 34 is interposed between the pipe connector 32 and the cap 30 for resiliently urging the seating washer 31 against the seat 22.

A second valve element 35 is slidably mounted in the second bore and it carries a cap 36 for securing a seating washer 37 in place thereon. The seating washer 37 cooperates with the valve seat 25 for controlling the flow of fluid thereby. A pipe connector 38 is carried at the end of the second bore for connecting a fluid supply pipe 39 in communication with the second bore. Preferably the pipe connector 38 is provided with an orifice 40. A spring 41 is interposed between the pipe connector 38 and the cap 36 for resiliently urging the seating washer 37 against the seat 35.

Packing rings 43 held in place by retaining rings 44 seal the valve elements 29 and 35 to prevent the passage of fluid therealong.

The end of the first valve element 39 is provided with a head 46 which is screw threaded for adjustably carrying a stop 47. Depending upon the position of the stop 47 with respect to the head 46, the valve element 29 may be moved inwardly to varying extents. The second valve element is provided with a head 48.

An operating member 50 provided with a handle 51 is pivotally mounted on the valve body 11. Screws 52 secure a cam member 53 to the inside of the operating member 50. The cam member 53 is provided with a cam surface 54 for engaging the head 46 for moving the first valve element 29 when the operating member is moved in one direction from a neutral position. The cam member is also provided with another cam surface 55 for engaging the head 48 for moving the second valve element 35 inwardly when the operating member 50 is moved in one direction or the other from the neutral position. The cam member 53 is provided with aligned holes 56 for receiving a pivot pin 57 carried by an extension 58 of the valve body 11. Thus the operating member 50, and associated cam member 53, is pivotally mounted on the valve body 11 transversely of the valve elements for moving the valve elements when the operating member 50 is moved from its neutral position.

With the parts in the position shown in the drawings, the operating member 50 is in the neutral position and the springs 34 and 41 are maintaining the valve elements 29 and 35 extended with the seating washers 31 and 37 thereof engaging the valve seats 22 and 25 respectively. In this position, no fluid flows from the supply pipe 33 and 39 through the first and second bores respectively to the discharge passages 26 and 27. Preferably, the supply pipe 33 supplies syrup while the supply pipe 39 supplies soda water. When the handle 51 of the operating member 50 is moved outwardly, the operating member 50 and the associated cam member 53 are moved in one direction from the neutral position and the cam surface 55 engages the head 48 to move the second valve element 35 inwardly against the action of the spring 41 whereupon soda water is permitted to flow from the supply pipe 39 through the orifice 40 and the second bore 23 past the valve seat 25 into the discharge passage 27. The orifice 40 provides a preliminary effervescing effect to the soda water.

When the handle 51 of the operating member is returned to the neutral position, the cam member 53 is returned to the neutral position whereupon the spring 41 forces the second valve element 35 outwardly to seat the seating washer 37 on the valve seat 25 to stop the flow of soda water.

When the handle 51 of the operating member 50 is moved inwardly from the neutral position, the operating member 50 and the cam member 53 associated therewith are rotated in the opposite direction. The cam surface 55 engages the head 48 to move the second valve element inwardly to permit the flow of soda water, as described above. The cam surface 54 also engages the head 46 of the first valve element 29 to move the same inwardly against the action of the spring 34, and the amount of inward movement of the valve element 29 is determined by the adjustable stop 47. Syrup is then permitted to flow from the supply pipe 33, through the bore 20, past the seat 22, into the discharge passage 26, and the amount of such fluid flow is regulated by the adjustable stop 47. When the operating member 50 is returned to the neutral position, the springs 34 and 41 move the valve elements 29 and 35 outwardly to seat the seating washers 31 and 37 against the valve seats 22 and 25 respectively to shut off the flow of syrup and soda water. The cam surfaces 54 and 55 are so arranged with respect to the heads 46 and 48 that the springs 34 and 41 operate to return the operating member 50 to the neutral position whenever the handle 51 thereof is not manually maintained out of the neutral position.

The discharge passage 26 for the syrup is preferably provided with a discharge tube 60, and the discharge passage 27 for the soda water is preferably provided with a baffle assembly which comprises a nut 61 secured to the valve body 11 and provided with a series of annularly arranged holes 62 and a central hole 63. A baffle member 64 is secured in the central hole 63 and is provided with a baffle surface 65 extending under the annularly arranged holes 62. Thus when soda water is dispensed through the discharge passage 27, it passes through the annularly arranged holes 62 and over the baffle surface 65 whereby the same is effervesced. A dispensing nozzle 66 is secured to the valve body 11 at 67 and operates to dispense soda water from the baffle assembly or a combination of soda water from the baffle assembly and syrup from the tube 60. The tube 60 preferably dispenses the syrup to the mouth of the dispensing nozzle 66 and the baffle assembly in effervescing the soda water operates to maintain the interior of the dispensing nozzle clean and free from syrup.

While for purposes of illustration one form of this invention has been disclosed, other forms thereof may become apparent to those skilled in the art upon reference to this disclosure, and, therefore, this invention is to be limited only by the scope of the appended claims and prior art.

I claim for my invention:

1. A mixing and dispensing valve comprising a valve body having a pair of parallel bores each provided with a valve seat intermediate the ends thereof and a discharge passage communicating with each bore adjacent the valve seat, a first valve element slidable in one of the bores and extending outwardly therefrom and cooperating with the seat thereof to vary the flow of fluid therethrough, a second valve element slidable in the other bore and extending outwardly therefrom and cooperating with the seat thereof to vary the flow of fluid therethrough, an operating member pivoted to the exterior of the valve body transversely of the valve elements and provided with a pair of cams for moving the first and second valve elements away from their seats when the operating member is moved away from a neutral position in one direction and for moving the first valve element away from its seat when the operating member is moved away from the neutral position in the other direction, a baffle member associated with the discharge passage controlled by the first valve element for effervescing the fluid discharged therefrom, and a dispensing nozzle about the baffle member for dispensing fluids from both discharge passages.

2. A mixing and dispensing valve comprising a valve body having a pair of parallel bores each provided with a valve seat intermediate the ends thereof and a discharge passage communicating with each bore adjacent the valve seat, a first valve element slidable in one of the bores and extending outwardly therefrom and cooperating with the seat thereof to vary the flow of fluid therethrough, a second valve element slidable in the other bore and extending outwardly therefrom and cooperating with the seat thereof to vary the flow of fluid therethrough, an operating member pivoted to the exterior of the valve body transversely of the valve elements and provided with a pair of cams for moving the first and second valve elements away from their seats when the operating member is moved away from a neutral position in one direction and for moving the first valve element away from its seat when the operating member is moved away from the neutral position in the other direction, an adjustable stop for adjustably limiting the movement of the second valve element away from its seat, a baffle member associated with the discharge passage controlled by the first valve element for effervescing the fluid discharged therefrom, and a dispensing nozzle about the baffle member for dispensing fluids from both discharge passages.

3. A mixing and dispensing valve comprising a valve body having a pair of parallel bores each provided with a valve seat intermediate the ends thereof and a discharge passage communicating with each bore adjacent the valve seat, pipe connectors on one end of the valve body communicating with the bores, a first valve element slidable in one of the bores and cooperating with the seat thereof to vary the flow of fluid therethrough, a second valve element slidable in the other bore and extending outwardly therefrom and cooperating with the seat thereof to vary the flow of fluid therethrough, a spring in each bore between the pipe connectors and the valve elements for holding the valve elements against their respective seats, an operating member pivoted to the exterior of the other end of the valve body transversely of the valve elements and provided with a pair of cams for moving the first and second valve elements away from their seats when the operating member is moved away from a neutral position in one direction and for moving the first valve element away from its seat when the operating member is moved away from the neutral position in the other direction, an adjustable stop for adjustably limiting the movement of the second valve element away from its seat, a baffle member associated with the discharge passage controlled by the first valve element for effervescing the fluid discharged therefrom, and a dispensing nozzle about the baffle member for dispensing fluids from both the discharge passages.

4. A mixing and dispensing valve comprising a valve body having a pair of parallel bores extending therethrough, each provided with a valve seat intermediate the ends thereof, said valve body also having a discharge passage communicating with each bore adjacent to the valve seat, a first valve element slidable in one of said bores and cooperating with the seat thereof to vary the flow of fluid therethrough, a second valve element slidable in the other of said bores and cooperating with the seat of said other bore to vary the flow of fluid therethrough, each of said valve elements having an end extending outwardly from said valve body, an operating member pivotally mounted on the exterior of said valve body about an axis substantially perpendicular to the axes of said valve elements, the mounting of said operating member being such that it is pivotable from a neutral position in opposite directions, said operating member including a pair of cams adapted to be pivoted into engagement with the extending ends of said valve elements, one of said cams being shaped to engage and move said first valve element from its seat when said operating member is moved in either of said opposite directions and the other of said cams being shaped to engage and move said second valve element from its seat only when said operating member is moved in one direction, and an adjustable stop for one of said valve elements, said adjustable stop being mounted on the outwardly extending end of said valve element and being adapted to engage the outer surface of said valve body upon movement of said valve element by its operating cam to limit the extent of movement of said valve element.

5. A mixing and dispensing valve comprising, in combination, a valve body having a pair of parallel bores extending therethrough each provided with a valve seat intermediate the ends thereof, said valve body also having a discharge passage communicating with each bore adjacent to the valve seat, a first valve element slidable in one of said bores and cooperating with the seat thereof to vary the flow of fluid therethrough, a second valve element slidable in the other of said bores and cooperating with the seat of said other bore to vary the flow of fluid therethrough, each of said valve elements having an end extending outwardly from said valve body, spring means associated with each valve element and biased to urge said element toward its cooperating valve seat, an operating member support extending outwardly from said valve body between the outwardly extending ends of said valve element, an operating member mounted on said support for pivoting movement about an axis substantially perpendicular to the axes of said valve elements, said operating member being pivotable from a neutral position in opposite directions about said axis and including an outwardly extending lever arm terminating in a handle adapted to be manually grasped to pivot said operating member, the center of said handle being pivotable in a plane substantially equi-distant from said valve elements whereby forces applied to said valve through said handle are normally distributed substantially equally to said valve elements, said operating member also including cam surfaces positioned to engage the extending ends of said valve elements when the operating member is pivoted, one of said cam surfaces being shaped to engage and move said first valve element from its seat when said operating member is moved in either of said opposite directions and the other of said cam surfaces being shaped to engage and move said second valve element from its seat only when said operating member is moved in one direction, the areas of engagement of said cam surfaces and said extending ends of said valve elements being substantially spaced from the plane of the axes of said valve elements, whereby said spring means tends to urge said operating member toward said neutral position.

6. A mixing and dispensing valve according to claim 5 and wherein said member includes a cup-like shield to which said lever arm and handle are secured and which substantially encases said cam surfaces and the outwardly extending ends of said valve elements and has a rim positioned close to but spaced somewhat from said valve body to permit movement of said operating member with respect to said valve body, said shield operating to transmit forces exerted on said handle and lever arm to said cam surfaces and said valve element ends.

ARTHUR B. SEGAL.

References Cited in the file of this patent

UNITED STATES PATENTS

| Number | Name | Date |
|---|---|---|
| 649,928 | Gillen | May 22, 1900 |
| 673,234 | Boothman et al. | Apr. 30, 1901 |
| 1,128,302 | Fausek et al. | Feb. 16, 1915 |
| 1,630,695 | England | May 31, 1927 |
| 1,743,738 | Travis | Jan. 14, 1930 |
| 2,231,460 | Barman | Feb. 11, 1941 |
| 2,446,714 | Milner | Aug. 10, 1948 |
| 2,574,624 | Cochin | Nov. 13, 1951 |